US012709113B2

(12) United States Patent
Kuroda

(10) Patent No.: US 12,709,113 B2
(45) Date of Patent: Aug. 18, 2026

(54) METHOD FOR MANUFACTURING DECORATIVE PIECE OF THERMOPLASTIC SYNTHETIC RESIN

(71) Applicant: PLUS CORPORATION, Osaka (JP)

(72) Inventor: Takeshi Kuroda, Osaka (JP)

(73) Assignee: PLUS CORPORATION, Osaka (JP)

( * ) Notice: Subject to any disclaimer, the term of this patent is extended or adjusted under 35 U.S.C. 154(b) by 192 days.

(21) Appl. No.: 17/791,386

(22) PCT Filed: Jan. 13, 2021

(86) PCT No.: PCT/JP2021/000842
§ 371 (c)(1),
(2) Date: Aug. 29, 2023

(87) PCT Pub. No.: WO2022/153396
PCT Pub. Date: Jul. 21, 2022

(65) Prior Publication Data
US 2024/0017566 A1 Jan. 18, 2024

(51) Int. Cl.
*B44F 9/12* (2006.01)
*B44C 1/24* (2006.01)
*B44C 3/08* (2006.01)

(52) U.S. Cl.
CPC .................. *B44F 9/12* (2013.01); *B44C 1/24* (2013.01); *B44C 3/082* (2013.01)

(58) Field of Classification Search
CPC . B62D 29/004; B29C 43/18; B29C 2043/147; B29C 45/14377
See application file for complete search history.

(56) References Cited

U.S. PATENT DOCUMENTS 5,589,022 A 12/1996 Kuwahara
2007/0296118 A1 12/2007 Kuwahaha
(Continued)

FOREIGN PATENT DOCUMENTS

CN 105431304 A 3/2016
EP 2172959 A1 * 4/2010 .......... H01H 13/704
(Continued)

OTHER PUBLICATIONS

Machine Translation of WO 2019130487.*
(Continued)

*Primary Examiner* — Christopher T Schatz
(74) *Attorney, Agent, or Firm* — Oliff PLC

(57) ABSTRACT

The present invention provides a method for manufacturing a decorative piece made of a thermoplastic synthetic resin and capable of providing a suede-like appearance. The method for manufacturing the decorative piece 10 comprises preparing a film-like or sheet-like upper layer material 30 made of thermoplastic synthetic resin, placing the upper layer material on a table 46 that serves as a lower electrode, putting an engraved die 41 that serves as an upper electrode on the upper layer material, and subjecting the upper layer material to high-frequency dielectric heating by oscillating high-frequency between the table and the engraved die, wherein the upper layer material is printed with a decorative ink containing urethane beads mixed in medium on a specified surface area 31 thereof, and wherein the engraved die has a texture engraved surface 42 formed by a laser engraving process on an area opposing the specified surface area of the upper layer material, whereby a suede-like unevenness is formed in the specified area of the upper layer material by the high-frequency dielectric heating.

2 Claims, 5 Drawing Sheets

(56) References Cited

U.S. PATENT DOCUMENTS

| | | | | |
|---|---|---|---|---|
| 2009/0242112 | A1 * | 10/2009 | Taeger | B29C 33/424<br>156/272.8 |
| 2010/0164870 | A1 | 7/2010 | Kunthady et al. | |
| 2014/0106139 | A1 | 4/2014 | Abrams | |
| 2016/0101601 | A1 | 4/2016 | Abrams | |
| 2016/0121646 | A1 | 5/2016 | Vermeulen | |

FOREIGN PATENT DOCUMENTS

| | | | | |
|---|---|---|---|---|
| EP | 3 733 427 | A1 | 11/2020 | |
| FR | 2 575 698 | A1 | 7/1986 | |
| GB | 1158471 | A | 7/1969 | |
| JP | H06-218886 | A | 8/1994 | |
| JP | H08-230394 | A | 9/1996 | |
| JP | H09-226225 | A | 9/1997 | |
| JP | 2001-314984 | A | 11/2001 | |
| JP | 3235943 | B2 | 12/2001 | |
| JP | 2016-502470 | A | 1/2016 | |
| KR | 10-1226675 | B1 | 1/2013 | |
| WO | 2006/051661 | A1 | 5/2006 | |
| WO | 2009/011298 | A1 | 1/2009 | |
| WO | WO-2019130487 | A1 * | 7/2019 | B32B 1/00 |

OTHER PUBLICATIONS

Dec. 6, 2023 Office Action issued in Chinese Patent Application No. 202180010598.0.

Dec. 1, 2023 Extended Search Report issued in European Patent Application No. 21908079.3.

Mar. 16, 2021 International Search Report issued in International Patent Application No. PCT/JP2021/000842.

* cited by examiner

METHOD FOR MANUFACTURING DECORATIVE PIECE OF THERMOPLASTIC SYNTHETIC RESIN

TECHNICAL FIELD

The present invention relates to a method for manufacturing decorative pieces made of thermoplastic synthetic resin to be applied to adherends such as clothing, bags, hats, etc. More specifically, the invention relates to a method for manufacturing decorative pieces made of thermoplastic synthetic resin and having an appearance of suede-like unevenness.

BACKGROUND ART

A method for manufacturing decorative pieces of a thermoplastic synthetic resin (hereinafter referred to as "decorative piece" as appropriate) through high-frequency dielectric heating is known in the art (for example, see Patent Document 1).

The decorative piece is formed by subjecting a film or sheet made of thermoplastic synthetic resin (hereinafter referred to as "upper layer material") to high-frequency dielectric heating while being sandwiched between an engraved die and a flat plate die and softening the upper layer material to form into a three-dimensional shape.

The thermoplastic synthetic resin of the upper layer material is inorganic and provides an appearance like plastic and rubber on the surface of the decorative piece. Therefore, such decorative pieces were less luxurious than leather-made or fabric-made patches with embroidery and others.

PRIOR ART DOCUMENT

Patent Document 1: Japanese Patent No. 3235943

SUMMARY OF INVENTION

Problems to be Solved by the Invention

There is a strong demand for a decorative piece made of thermoplastic synthetic resin that has a suede-like unevenness and provides a high-class impression similar to or exceeding that of leather-made or fabric-made embroidered patches.

An object of the present invention is to provide a method for manufacturing a decorative piece made of a thermoplastic synthetic resin that provides an appearance of suede-like unevenness.

Means to Overcome the Problems

The present invention provides a method for manufacturing a suede-like decorative piece made of a thermoplastic synthetic resin, the method comprising

- a step of preparing a film-like or sheet-like upper layer material made of thermoplastic synthetic resin,
- a step of placing the upper layer material on a table that serves as a lower electrode,
- a step of putting an engraved die that serves as an upper electrode on the upper layer material, and
- a step of subjecting the upper layer material to high-frequency dielectric heating by oscillating high-frequency between the table and the engraved die, wherein

- the step of preparing the upper layer material comprises a decorative ink printing step of providing a decorative ink containing urethane beads mixed in medium on a specified surface area of the film-like or sheet-like upper layer material made of thermoplastics synthetic resin,
- the engraved die has a texture engraved surface formed by a laser engraving process on an area opposing the specified surface area of the upper layer material, and
- the high-frequency dielectric heating using the engraved die with the texture engraved surface provides a suede-like unevenness formed in the specified area of the upper layer material.

The step of preparing the upper layer material comprises subjecting the surface of the upper layer material to a silk-screen printing process with a colored ink containing a pigment and/or a dye prior to the decorative ink printing step.

Effect of the Invention

According to the present invention, the method for manufacturing a decorative piece includes printing a decorative ink with urethane beads on the upper layer material using an engraved die having a finely textured surface, whereby a suede-like unevenness is formed on the upper layer material to improve an appearance of the decorative piece.

EMBODIMENT FOR CARRYING OUT THE INVENTION

The method for manufacturing the thermoplastic synthetic resin decorative piece 10 according to the present invention will be described below with reference to the drawings. Each of the figures shown is somewhat exaggerated and emphasized to explain a decorative piece 10, a decorative piece material 20, the thickness of each layer of the decorative piece and the decorative piece material, and unevenness and thickness of a die, etc. Further, the size, shape, and pattern of the decorative piece 10 are only examples and can be modified as needed.

Figure 1:
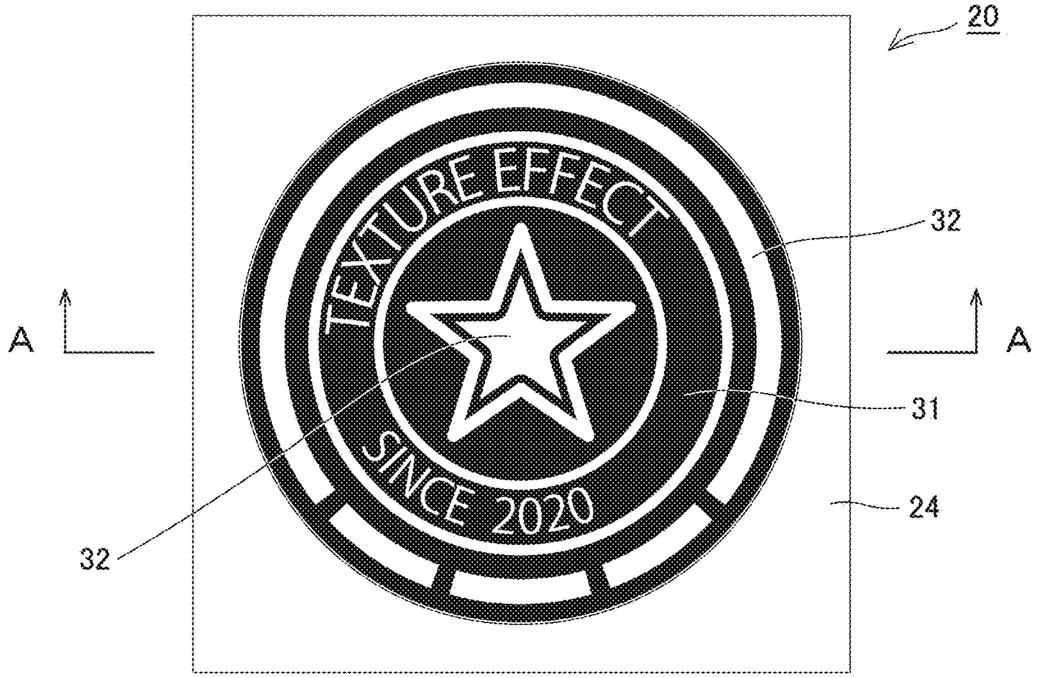
FIG. 1 is a plan view of a decorative piece material according to an embodiment of the present invention.
Figure 2:
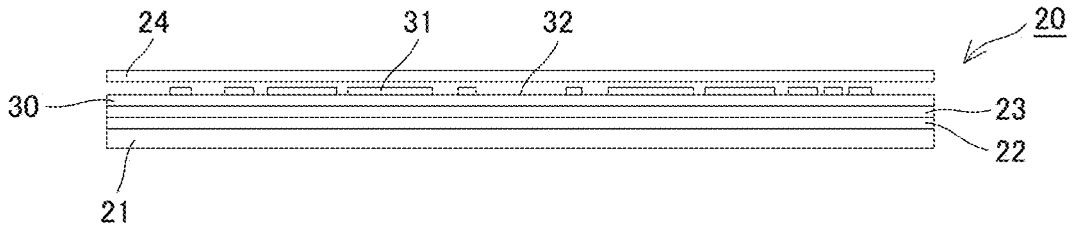
FIG. 2 is a sectional view taken along line A-A of FIG. 1.

The present invention is directed to a method for manufacturing a decorative piece 10, wherein the decorative piece material 20 shown in FIGS. 1 and 2 is loaded between the dies 41 and 46 of the high-frequency dielectric heating apparatus 40 shown in FIGS. 3 to 6 and then subjected to high-frequency dielectric heating, thus producing the decorative piece 10 having a surface with an appearance of suede-like unevenness 11. The suede-like unevenness 11 has a lot of fine textures and closely resembles a fine surface of the material such as fabric or leather. Textures include fine emboss such as sand grain, silk grain, etc.

As shown in FIG. 1, the decorative piece material 20 is formed by subjecting the surface of the upper layer material 30 to a silk screen printing and a decorative printing, which will be described later. In this embodiment, the decorative piece material 20 is a multi-layered structure wherein the bottom layer is a releasable paper 21, on which two types of hot-melt films 22, 23, an upper layer material 30 made of thermoplastic synthetic resin, and a carrier film 24 are placed in order. Each layer other than the upper layer material 30 and the presence or absence of each layer are not limited to this configuration. For example, the hot-melt films 22 and 23 may be polyurethane films. Further, a film or sheet made of other materials may be added. For example, if hot-melt film is not used to apply the decorative piece 10 to the adherend, the hot-melt layers 22, 23 are unnecessary.

Examples of the thermoplastic synthetic resin used for the upper layer material 30 include polyvinyl chloride, polyurethane, polyester, and polyolefin. The upper layer material 30 may be in the form of a film or a sheet. Further, the film or sheet of the upper layer material 30 may be of white urethane, metal-deposited urethane with metal vapor deposition, or transparent urethane. The bottom layer of the upper layer material 30 may be interposed with an adhesive layer or a dye transfer preventive film or may be overlapped with a thermoplastic synthetic resin film, if necessary.

In the present embodiment, the upper layer material 30 comprises an area 31 for providing a coarse surface to produce a suede-like unevenness and an area 32 other than the area 31 and for forming patterns such as star, circle, character, circular arc, etc., as shown in FIG. 1. The pattern to be formed is, of course, not limited to the shown one.

The upper layer material 30 is preliminarily subjected to a known silk screen printing with colored inks containing pigments and/or dyes on the entire surface or in the pattern-forming area 32 mentioned above. If the upper layer material 30 is already colored or no coloring is required, this silk screen printing can be skipped. Coloring may also be done by methods other than silk screen printing. The next decorative printing can also be performed by silk screen printing.

Decorative printing is applied to the upper layer material 30. The decorative printing is performed at least on the coarse surface-forming area 31. Decorative printing can be done, for example, by silk screen printing, using decorative ink mixed with urethane beads in a medium. Urethane beads may be beads commonly used as matting agents. The urethane beads are, for example, FUNCORT UB200 (trade name) manufactured by Jujo Chemical K.K. Urethane beads may preferably be colorless, transparent granules with a particle size of 2 μm to 30 μm. Of course, the particle size and color of the urethane beads are not limited to this. The unevenness to be formed can be deepened by increasing the particle size of the urethane beads to be employed.

The die 41 with the engraved texture described below may be utilized to form unevenness on the upper layer material that does not have the decorative printing described above. However, the upper layer material obtained by using an engraved die with texture lacked sufficient depth. In addition, the upper layer material had a very plastic and rubbery appearance, resulting in an inorganic shine. Therefore, the decorative printing is an essential process in the present invention.

A step of preparing the decorative piece material 20 is performed by forming the upper layer material 30 into the layer structure shown in FIG. 2 and covering the surface of the layer with the carrier film 24 after the decorative printing. The carrier film 24 is adhesive on the side of the upper layer material 30 and is attached to the upper layer material 30. In the present embodiment, the decorative piece material 20 comprises, from the bottom layer side, a releasable paper 21, a hot-melt film 22 of #3415 (manufactured by Bemis Company), a hot-melt film 23 of #203 (manufactured by Nippon Matai K.K.), a silk screen-printed and a decorative-printed upper layer material 30 of polyurethane film, and a transparent carrier film 24.

Figure 3:
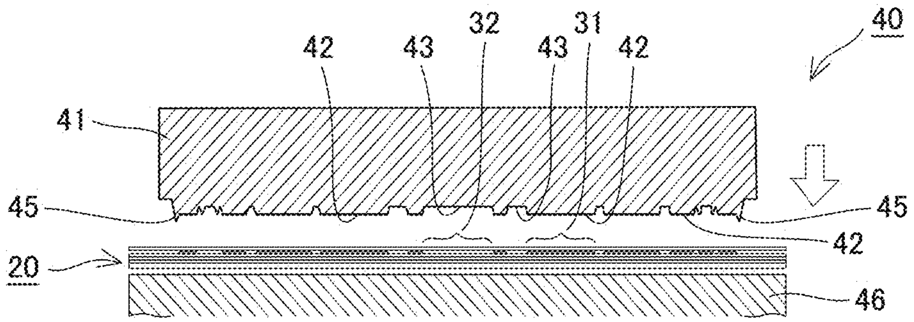
FIG. 3 is a sectional view of a high-frequency dielectric heating apparatus showing a state where a decorative piece material is placed on a table with an engraved die approaching the decorative piece material.
Figure 6:
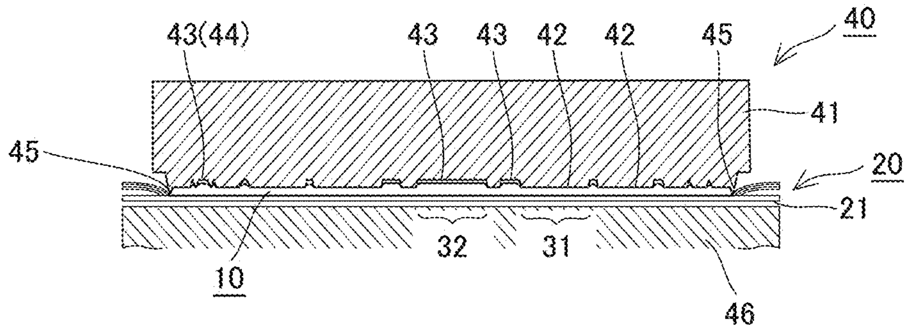
FIG. 6 is a sectional view of a high-frequency dielectric heating apparatus showing a state where the decorative piece material is being subjected to high-frequency dielectric heating.

The prepared decorative piece material is subjected to high-frequency dielectric heating by a high-frequency dielectric heating apparatus 40 equipped with a high-frequency dielectric oscillator. As shown in FIGS. 3 and 6, the high-frequency dielectric heating is performed by placing the decorative piece material 20 between the engraved die 41 serving as the upper electrode and the table 46 serving as the lower electrode.

Figure 4:
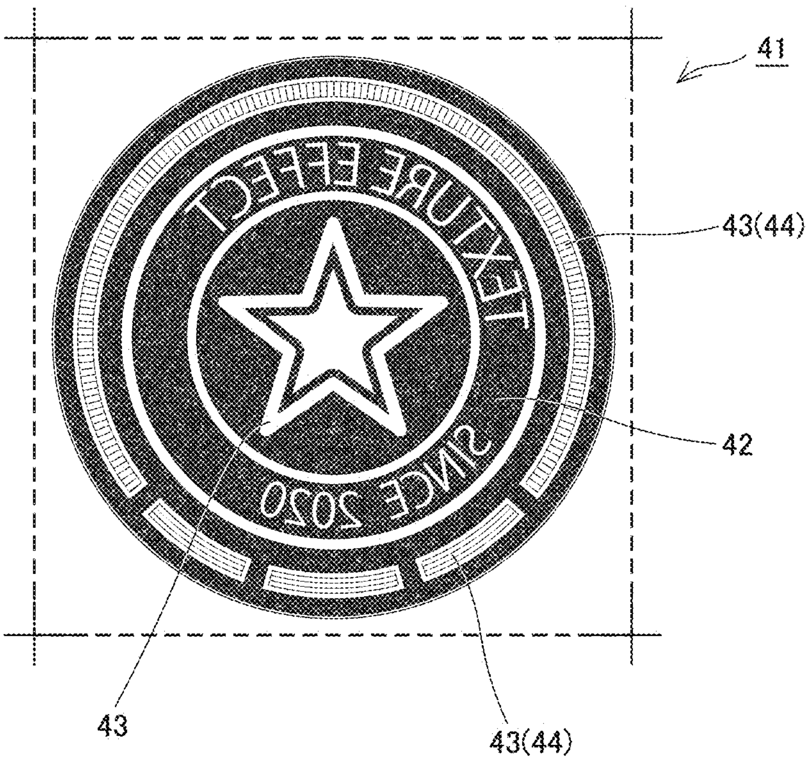
FIG. 4 is a bottom view of the engraved die as viewed from the decorative piece material side.
Figure 5:
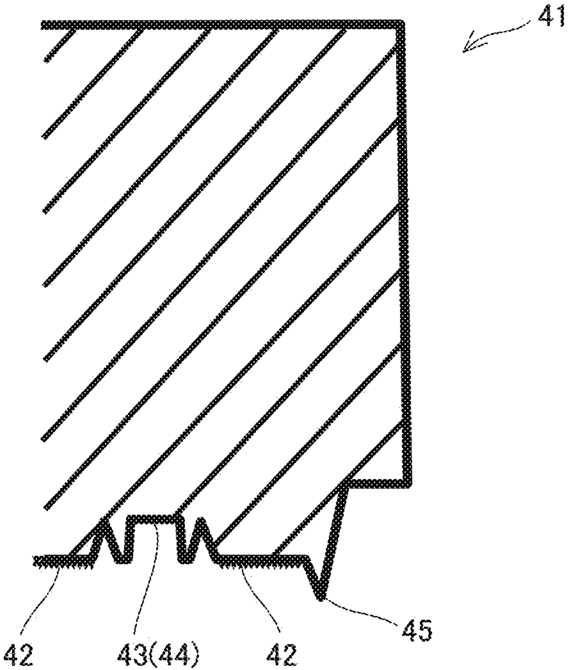
FIG. 5 is a partially enlarged sectional view of the engraved die.

As shown in FIGS. 3 to 5, the engraved die 41 serving as the upper electrode has a texture engraved surface 42 opposing the coarse surface-forming area 31 of the decorative piece material 20 and a pattern-facing groove 43 formed slightly deeper than the texture engraved surface 42 on the area opposing the pattern-forming area 32. The pattern facing groove 43 is formed by inverting the pattern-forming area 32. The engraved die 41 is formed on its outer periphery with melt-cutting blade 45 to cut unwanted portions other than the releasable paper 21 from the decorative piece material 20.

More specifically, as shown in FIG. 4, a fine texture is formed on the texture engraved surface 42 of the engraved die 41 by a laser engraving technology. The fine texture formed on the die by the laser engraving serves to create a suede-like fine unevenness 11 on the coarse surface-forming area 31 of the upper layer material 30 (see FIGS. 7 to 9). The laser engraving can produce fine textures of about 0.01 mm to 0.3 mm in width and 0.01 mm to 0.3 mm in depth on the die 41. Such fine textures can be engraved relatively easily by adjusting the output of the laser. However, a blade or other tool has difficulty engraving the fine textures that can be achieved by laser engraving.

The pattern facing groove 43 is formed on an area that is opposite to the pattern-forming area 32 and is other than the coarse surface-forming area 31 of the decoration piece material 20. When the groove bottom of the pattern facing groove 43 is flat, the pattern 12 to be produced on the decorative piece 10 is also flat (see FIGS. 7 to 9). In addition, for example, if an embossed pattern 44 is engraved on the groove bottom of the pattern facing groove 43 with a circular-arc shape in FIG. 4, an embossed pattern 13 can be formed on the pattern-forming area 32 (see FIGS. 7 and 9).

The melt-cutting blade 45 is to cut the decorative piece material 20, leaving the releasable paper 21 and carrier film 24, and has a length that reaches the releasable paper 21 when melt-cutting is performed by high-frequency. In the illustrated embodiment, the melt-cutting blade 45 has the same circular shape as the final product of decorative piece 10.

A table 46 having a flat upper surface can be used as a lower electrode.

The high-frequency dielectric heating apparatus 40 incorporates the engraved die 41 movable vertically above the table 46 mentioned before. The engraved die 41 and the table 46 are electrically connected to a high-frequency dielectric oscillator.

In the high-frequency dielectric heating apparatus 40, the decorative piece material is placed on the table 46, as shown in FIG. 3. The decorative piece material 20 is placed, with the top surface side being the carrier film 24. If necessary, the decorative piece material 20 can be positioned and fixed to the table 46 with tape or the like.

In this state, the engraved die 41 is lowered, as shown in FIG. 6. On the lower surface of the engraved die 41, the texture engraved surface 42 and the pattern facing groove 43 face the coarse surface-forming area 31 and the pattern-forming area 32 of the upper layer material 30, respectively, and the melt-cutting blade 45 is in alignment with the outer shape of the final product of the decorative piece 10.

Then, high-frequency dielectric heating is applied between the engraved die 41 and the table 4, while pressing the engraved die 41 toward the table 46, so that the insulator generates heat, and the upper layer material 30 swells. Urethane beads that were decoratively printed on the coarse surface-forming area 31 also generate heat and swell. Then, a fine, coarsened shape that copies the fine texture of the texture engraved surface 42 of the engraved die 41 is transferred to the decorative piece material 20 and a suede-like unevenness 11 (see FIGS. 7 to 9) is produced. In this aspect, the decorative piece material 20 bulges in the pattern facing groove 43 and is then shaped along the pattern facing groove 43 to form the pattern 12. If the pattern facing groove 43 has an embossed pattern 44 (at arcuate portion on the outer periphery in FIG. 4), the shape is transferred, and an embossed pattern 13 is formed in the pattern 12 of the decorative piece material 20. The upper layer material 30 and its underlying hot-melt films 22, 23 are adhered to each other and joined together. The decorative piece material 20 is cut by the melt-cutting blade 45 into the shape of the final product of the decorative piece 10 leaving the releasable paper 21 and carrier film 24. Of these materials that have been fused and joined together, the portion located inside the melt-cutting blade 45 becomes the decorative piece 10.

Figure 7:
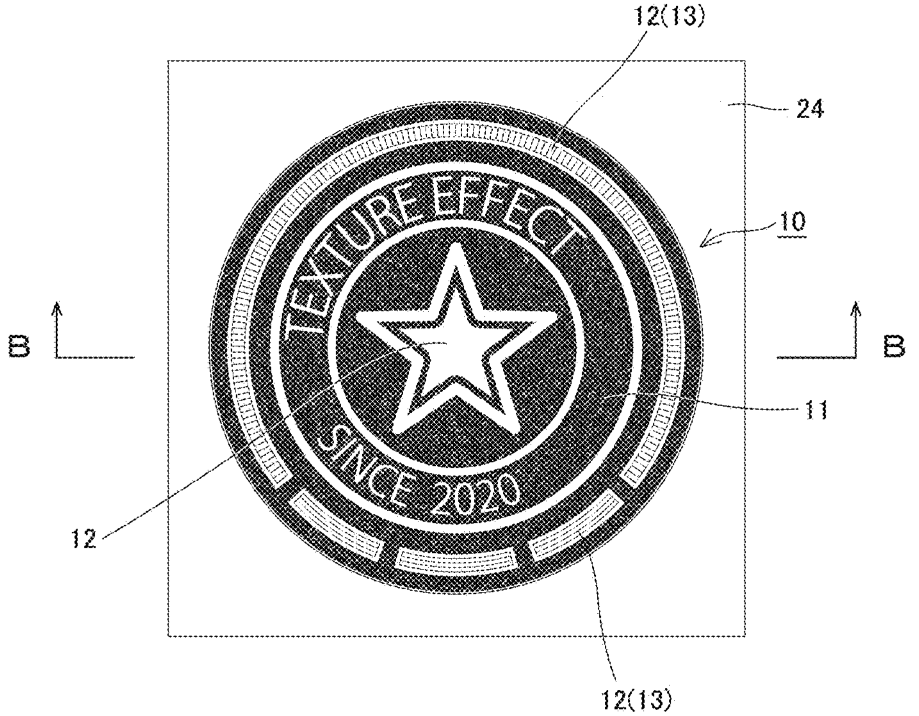
FIG. 7 is a plan view of the decorative piece produced by the manufacturing method of the present invention.
Figure 8:
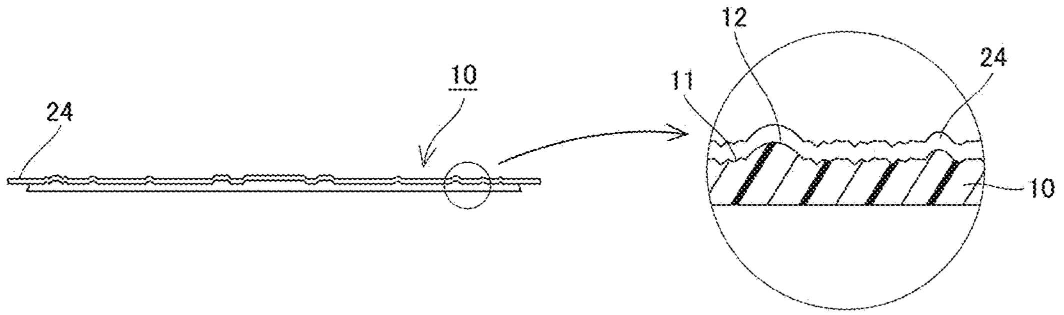
FIG. 8 is a sectional view and a partially enlarged view taken along line B-B of FIG. 7.

When the high-frequency dielectric heating to the decorative piece material 20 is completed, the engraved die 41 is moved up and the processed decorative piece material 20 is unloaded. The resulting decorative piece material 20 is in the form of the decorative piece 10 wherein its unwanted outer portion is cut by the melt-cutting blade 45. From this state, the releasable paper 21 is peeled off and the unwanted portion is removed. As a result, the decorative piece 10 is left under the carrier film 24, as shown in FIGS. 7 and 8. The decorative piece 10 can be attached to clothing, bags, hats, and other adherends via heat transfer by hot-melting, and then the carrier film 24 can be removed.

Figure 9:
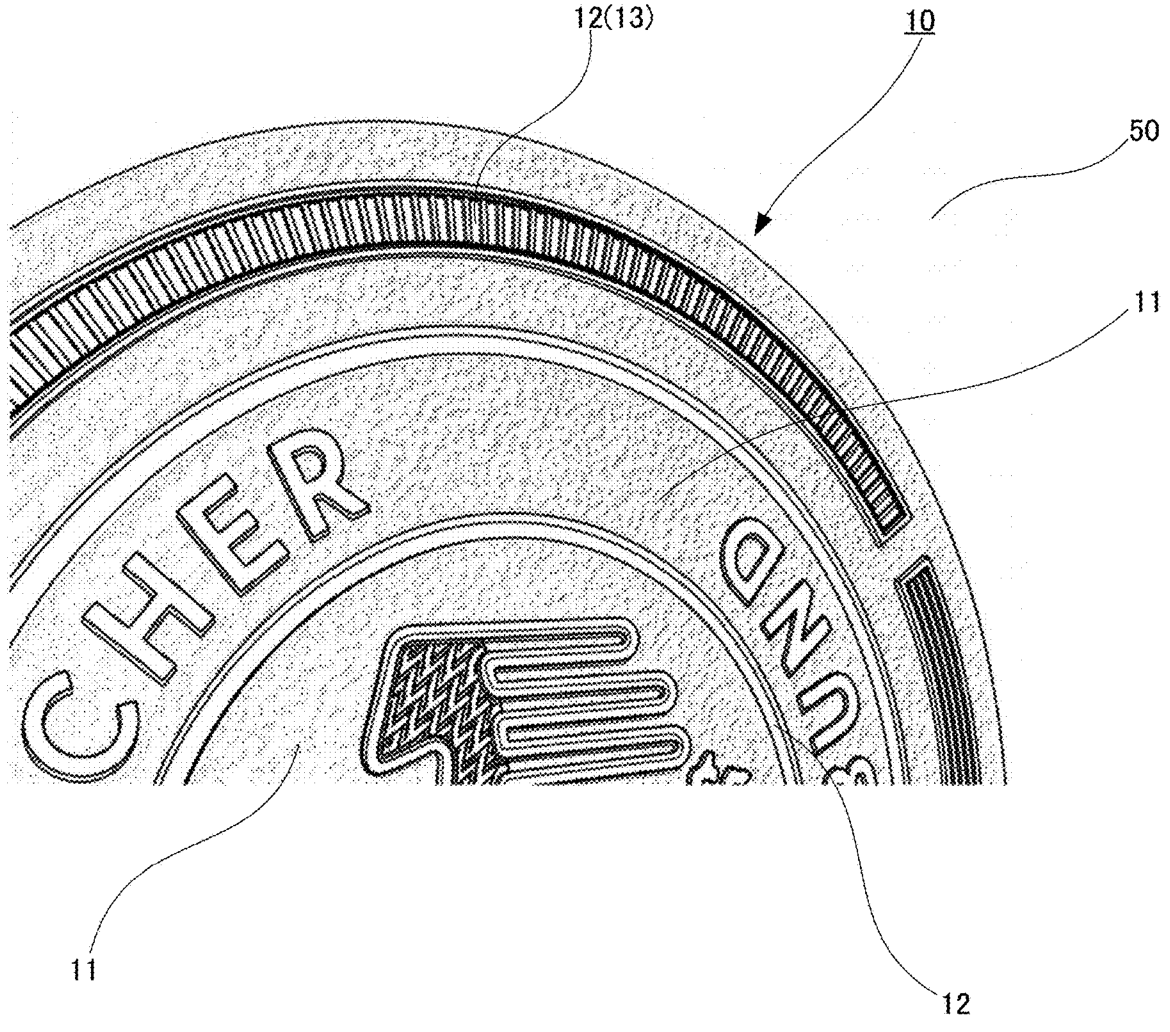
FIG. 9 is a photograph showing that the decorative piece produced by the manufacturing method of the present invention is applied to a fabric.

FIG. 9 is a photograph showing that the decorative piece 10 obtained by the above-mentioned method is applied to an adherend (fabric) 50 by hot-melting. Referring to FIG. 9, it can be seen that a large number of fine-textured unevenness 11 are formed in the coarse surface-formed area 31, thus providing a suede-like appearance. Using matte urethane beads allows the area 31 to look similar to genuine leather or fabric with a low gloss.

The pattern-formed area 32 comprises a pattern 12 that follows the shape of the pattern facing groove 43 and an embossed pattern 13 that follows the embossed pattern 44 (arcuate portion on the outer periphery in FIG. 4) formed in the pattern facing groove 43.

The above description is for the purpose of explaining the present invention, and should not be construed as limiting the scope of the invention described in the claims. In addition, each part of the present invention is not limited to the above embodiment, and it goes without saying that various modifications can be made within the technical scope described in the claims.

For example, the upper layer material 30 can also be subjected to a decorative printing on the coarse surface-forming area 31 that was applied by the silk printing. In this case, the area 31 has a shape having suede-like unevenness appearance, and the pattern-forming area 32 remains an appearance of resin. When a metallized film is employed as the upper layer material 30, the decorative piece 10 has the pattern-formed area 32 wherein the pattern consisting of metallic marks or letters appears in a protruding shape. Decorative printing can also be applied to the entire area including over the silk printing. In this case, the coarse surface-formed area 31 has a suede-like unevenness shape, while the pattern-formed area 32 remains an appearance of matte resin.

When the decorative piece 10 is attached to the adherend by the method other than hot melting, the hot melt films 22, 23 may be unnecessary, and can be applied to the adherend by sewing. Further, when the decorative piece 10 is attached to the adherend by another method other than hot-melting, the hot-melt films 22 and 23 may be unnecessary and may be attached by sewing to the adherend. Since double-sided adhesive tape can be used instead of the hot melt films 22, 23 to attach to the adherend, the decorative piece 10 of the present invention can be used for bottle labels, decorative boxes, etc., to create a massive and luxurious decoration. In any of the embodiments mentioned above, the decorative piece 10 of the present invention is characterized by being less bulky, flexible, thin, and lightweight.

In the above embodiment, the decorative piece 10 of the present invention are manufactured one by one, but a long decorative piece can also be manufactured by arranging the engraved die 41 and the table 46 into a roll shape.

In addition, the decorative piece material 20 can also be bulked up and shaped by placing the thermoplastic synthetic resin sheet (foam sheet) under the upper layer material 30.

EXPLANATION OF REFERENCE NUMBERS

10 Decorative piece
11 Suede-like unevenness
20 Decorative piece material
30 Upper layer material
31 Coarse surface-forming area
32 Pattern-forming area
40 High-frequency dielectric heating apparatus
41 Engraved die
42 Texture engraved surface
43 Pattern-facing groove
45 Melt-cutting blade
46 Table

The invention claimed is:

1. A method for manufacturing a thermoplastic synthetic resin-made decorative piece with an upper surface having a first area and a second area of different pattern depths, the method comprising:

a step of producing an engraved die with a first engraved surface and a second engraved surface, wherein the first engraved surface is formed using a laser engraving process to have fine unevenness, the fine unevenness comprising depressions of about 0.01 mm to 0.3 mm in width and about 0.01 mm to 0.3 mm in depth, and the second engraved surface is formed to have a groove deeper than the depressions of the first engraved surface, a step of preparing a decorative piece material including an upper layer material in a film or sheet form made of a thermoplastic synthetic resin, wherein the upper layer material has the first area and the second area, and the first area is subjected to a decorative ink printing process using a decorative ink containing urethane beads mixed in medium, a step of putting the decorative piece material on a table, serving as a lower electrode, such that the upper surface faces upward, a step of placing the engraved die, to serve as an upper electrode, on the upper layer material such that the first engraved surface of the engraved die is opposite to the first area of the decorative piece, and the second engraved surface of the engraved die is opposite the second area of the decorative piece, and a step of subjecting the decorative piece material to high-frequency dielectric heating by oscillating a high-frequency between the table and the engraved die to produce the decorative piece shaped along the first engraved surface and the second engraved surface of the engraved die, and when the engraved die is removed, the decorative piece is produced, wherein the first area of the decorative piece has a pattern of a fine unevenness that follows the fine unevenness of the first engraved surface, and the second area of the decorative piece has a pattern that follows the deeper groove of the second engraved surface.

2. The method according to claim 1, wherein the step of preparing the decorative piece comprises subjecting the first area of the upper layer material to a silk-screen printing with a colored ink containing a pigment and/or a dye prior to the decorative ink printing process.

* * * * *